United States Patent Office 2,936,185
Patented May 10, 1960

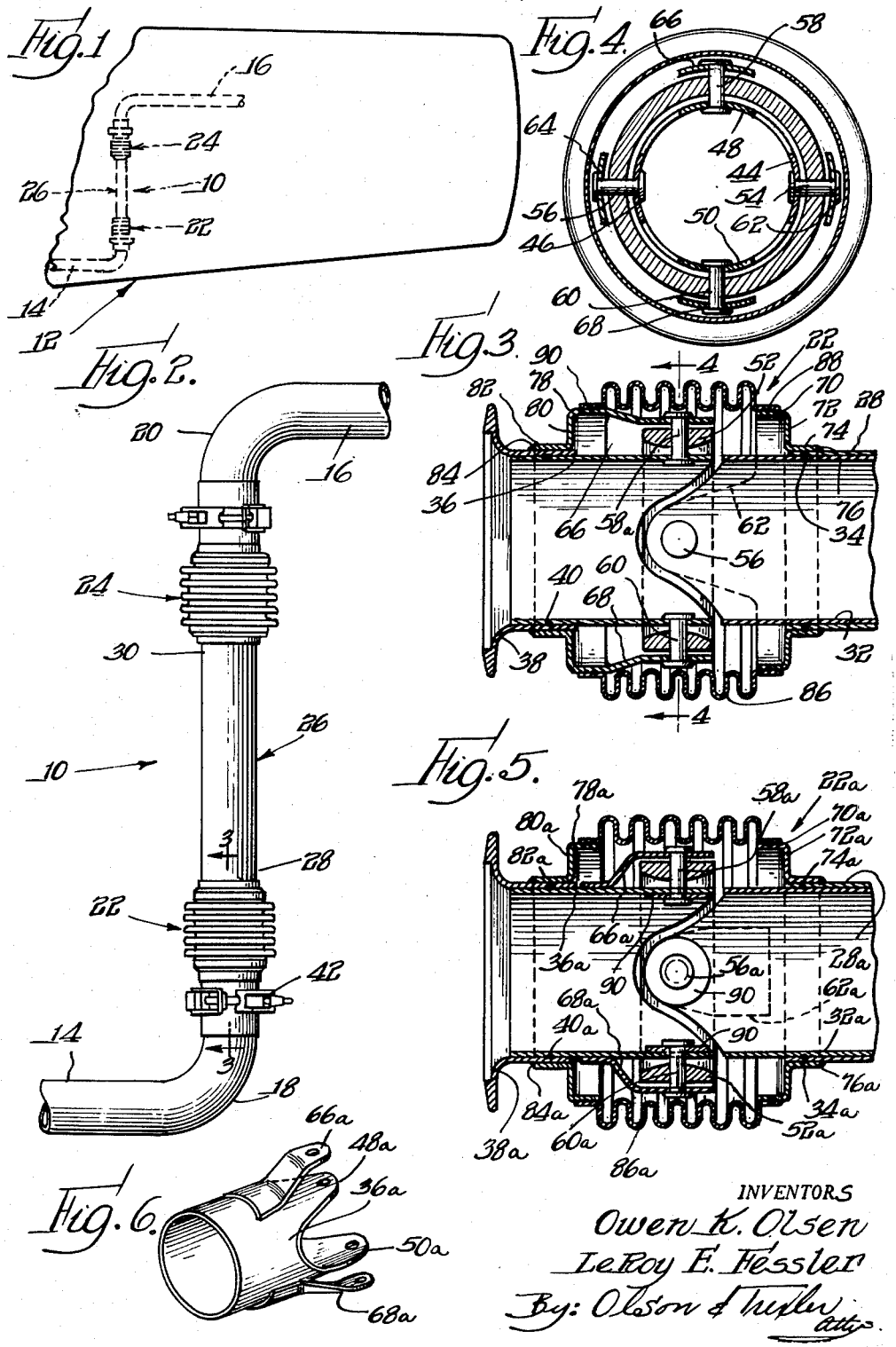

2,936,185

LATERALLY MOVABLE PIPE JOINT WITH BELLOWS

Owen K. Olsen, Elgin, and LeRoy E. Fessler, Bloomingdale, Ill., assignors to Flexonics Corporation, Maywood, Ill., a corporation of Illinois Application March 1, 1956, Serial No. 568,749

3 Claims. (Cl. 285—226)

The present invention relates to a novel flexible joint structure, and, more particularly, to a novel joint structure especially adapted to be connected in a duct system for conveying high velocity heated gases under pressure.

While the novel joint structure of the present invention may be utilized in various installations, it is particularly adapted to be connected between a pair of duct members of an aircraft heating, ventilating or deicing system so as to accommodate relative movement of the duct members axially as a result of thermal expansion or contraction and also to accommodate relative movement of the duct members transversely of a plane containing the duct members, which last mentioned movement might be caused by deflections of the air frame. It is an important object of the present invention to provide a novel lightweight flexible joint structure capable of restrained bilateral movement and adapted to be easily and economically produced and installed.

A further object of the present invention is to provide a novel flexible joint structure which is pivoted for restrained bilateral movement and which has a substantially unobstructed interior so as to minimize interference with a gas stream flowing therethrough and also to minimize fluid pressure drop between opposite ends thereof.

A more specific object of the present invention is to provide a novel joint structure of the above described type having a pair of pipe sections pivotally connected for bilateral movement in a simple and rugged manner without obstructing the interior of the pipe sections or materially increasing the bulk or outside dimensions of the structure so as to obtain a joint structure which is compact, and lightweight and has a minimum resistance to fluid flow and a long useful life.

Other objects and advantages of the present invention will become apparent from the following description and the accompanying drawings wherein:

Fig. 1 is a diagrammatic view showing a duct system in an airplane wing and including the novel joint structure of the present invention;

Fig. 2 is an enlarged fragmentary plan view showing flexible joint structures incorporating features of the present invention connected between a pair of oppositely extending and laterally offset duct members;

Fig. 3 is an enlarged fragmentary sectional view taken along line 3—3 in Fig. 2;

Fig. 4 is a cross sectional view taken along line 4—4 in Fig. 3;

Fig. 5 is a sectional view similar to Fig. 3 but showing a slightly modified form of the present invention; and Fig. 6 is a perspective showing a portion of the joint structure of Fig. 5.

Referring now more specifically to the drawings wherein like parts are designated by the same numerals throughout the various figures, a duct system 10 installed in an airplane wing 12 or the like may include a pair of elongated oppositely extending and laterally offset duct members 14 and 16. Such duct members are usually installed so that curved end portions or elbows 18 and 20 thereof are in axial aligned spaced relationship. The curved end portions are connected by flexible joint structures 22 and 24 incorporating the features of the present invention and described in detail below, and a transverse pipe section 26. In the embodiment shown, the member 26 has integral opposite end sections 28 and 30 which respectively provide elements of the joint structures 22 and 24. Thus, the two joint structures are connected as a single unit for facilitating installation in the duct system, but it should be understood, that the pipe sections 28 and 30 may be formed separately from an intermediate portion of the duct member 26 and may be removably connected thereto, if desired.

Referring particularly to Fig. 3, it is seen that the joint structure 22 includes a pipe section 32 extending within the pipe section 28 and welded thereto as at 34 and an oppositely extending axially aligned pipe section 36. A flanged member 38 is welded as at 40 to the outer end of the pipe section 36 to enable the pipe section to be secured to the elbow 18 by suitable clamping and sealing means 42.

The adjacent or inner ends of the pipe sections 32 and 36 are pivotally connected with each other for relative bilateral movement. This is accomplished by providing the pipe section 32 with oppositely disposed inner end extensions 44 and 46 which project between similar extensions 48 and 50 of the pipe section 36, which extensions are respectively connected to a ring member 52 by pins 54, 56, 58 and 60. The ring member loosely surrounds the inner end extensions of the pipe sections so as to permit the pipe sections to pivot relative to the ring member. The extensions of each of the pipe sections substantially conform in outline to the extensions of the other pipe section, and the pipe sections are slightly axially spaced as shown in Fig. 3 so as to permit limited relative pivotal movement between the pipe sections.

Each of the pivot pin members extends through and has an enlarged flattened head disposed within its associated pipe section extension for operatively connecting it with its associated pipe section extension without materially obstructing gas flow through the joint structure. In order to support outer ends of the pivot pin members with respect to the pipe sections as well as inner ends of the pin members and thereby eliminate any tendency of the pin members to bend or twist around their inner ends, supporting arm sections 62, 64, 66 and 68 extend over the ring member 52 and are welded or otherwise secured to outer ends of the pivot pins 54 through 60, respectively. In the embodiment shown in Figs. 3 and 4, these supporting arms 62 and 64 are formed integrally with and extend from a relatively large diameter cylindrical section 70 of an adapter member having a radial section 72 and a relatively small diameter cylindrical section 74 secured and sealed to the pipe section 28 by means of an annular weld 76. The supporting arms 66 and 68 are formed integrally with an outer cylindrical section 78 of an adapter member having a radially extending section 80 and an inner cylindrical section 82 which is secured and sealed to the end flange member by means of an annular weld 84.

In order to seal the flexible joint structure, a corrugated tube 86 surrounds the pipe section extensions and the pivotal connection means and has opposite ends thereof secured by means of annular welds 88 and 90 to the outer cylindrical sections 70 and 78 of the adapter members at axially opposite sides of the pivotal connecting means. It will be appreciated that the joint sealing means including the flexible tube in no way obstructs the flow of gas through the joint structure and that the flexible tube is shielded from the flowing stream of gas by the inner pipe sections 32 and 36 so as to protect it against erosion effects or other injury by the gas stream. It should also be noted that since the pivotal connecting means is housed between the corrugated tube and the inner pipe sections, the exterior diameter or dimensions of the joint structure are minimized while at the same time, the pipe sections remain free of any substantial internal obstruction to the fluid flow.

The joint structure 24 is substantially identical to the joint structure 22 and, therefore, need not be described in detail. However, in Fig. 5 there is shown a slightly modified form of the joint structure which is similar to the flexible joint 22 described above as indicated by the application of identical reference numerals with the suffix "a" added to corresponding elements. This embodiment differs in that the pivot pin supporting arms 62a through 68a are formed separately from the adapter members of the sealing means and are welded or otherwise secured directly to the inner pipe sections 32a and 36a. Furthermore, reinforcing washers 90 may be provided between the inner heads of the pivot pins and their associated pipe section extensions, if desired. Such washers may also be incorporated in the above described joint structure 24.

While the preferred embodiments of the present invention have been shown and described herein, it is obvious that many structural details may be changed without departing from the spirit and scope of the appended claims.

The invention is claimed as follows:

1. A flexible light-weight joint structure for conduits, comprising first and second substantially unobstructed and aligned pipe sections each having a pair of oppositely disposed axial extensions integral therewith, the axial extensions of one pipe section being complementally and curvilinearly shaped with respect to the axial extensions on the other pipe section and disposed therebetween in edgewise slightly spaced relation to provide a substantially continuous passageway, a ring member loosely but closely surrounding said axial extensions, a plurality of pin members with one pin member associated with each of said axial extensions and each pin member having the inner end thereof connected with its associated axial extension and disposed so as to avoid any substantial obstruction of the passageway through the pipe sections, each pin member extending through said ring member for pivotally connecting together the first and second pipe sections for bilateral relative pivotal movement and also retaining said pipe sections against relative axial displacement, a first annular sheet metal adaptor member including an axial end flange welded and sealed to the first pipe section at one side of said ring member, a second annular sheet metal adaptor member including an axial end flange welded and sealed to the second pipe section at the opposite side of said ring member, each of said adaptor members including a radially outwardly extending intermediate section and an outwardly disposed axial end flange integral with the corresponding intermediate section with said outwardly disposed axial end flanges spaced axially of said ring member, a flexible corrugated tube section surrounding said ring member and having opposite axially extending end sections telescoped with and welded and sealed to the corresponding outwardly disposed axial end flange of the adaptor members, means providing first and second pairs of sheet metal support arms respectively fixed to the first and second pipe sections and each pair being circumferentially symmetrically disposed with respect to the axial extensions of said pipe sections, each of said support arms having an axially extending portion overlying the exterior surface of said ring member and inwardly offset with respect to the outwardly disposed axial end flanges of said adaptor members and the innermost surfaces of the inward convolutions of said corrugated tube, and the outer ends of said pin members being fixed to corresponding support arms with the outermost ends thereof thereby spaced inwardly of the tube convolutions to eliminate frictional contact therewith during flexure of the joint structure while strengthening the mounting of the ring member.

2. A flexible joint structure as claimed in claim 1, wherein the outwardly disposed axial end flanges extend toward one another and wherein said sheet metal support arms are integral with the corresponding outwardly disposed axial end flanges of the adaptor members.

3. A flexible joint structure as claimed in claim 1, wherein the sheet metal support arms are mounted directly on the corresponding pipe sections and interiorly of the corresponding adaptor members.

References Cited in the file of this patent

UNITED STATES PATENTS

| | | |
|---|---|---|
| 390,240 | Legat | Oct. 2, 1888 |
| 658,516 | Smith | Sept. 25, 1900 |
| 1,064,623 | Duerrstein | June 10, 1913 |
| 1,499,050 | Broome | June 24, 1924 |
| 1,821,274 | Plummer | Sept. 1, 1931 |
| 2,451,252 | Stoeckley | Oct. 12, 1948 |

FOREIGN PATENTS

| | | |
|---|---|---|
| 627,120 | Great Britain | July 28, 1949 |
| 658,066 | France | Jan. 22, 1929 |
| 752,498 | Germany | Oct. 13, 1952 |
| 835,378 | Germany | Mar. 31, 1952 |